Patented Apr. 14, 1931

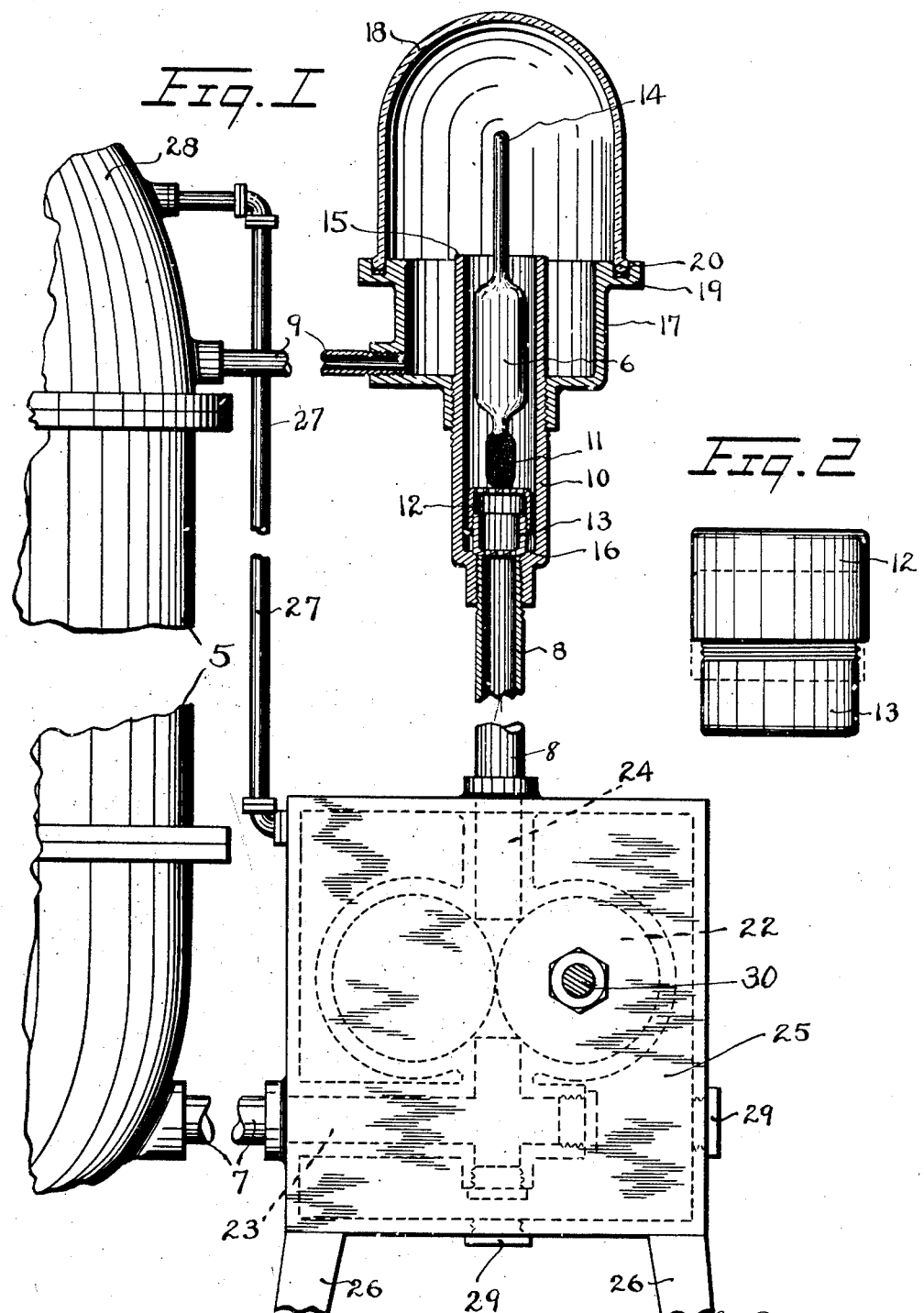

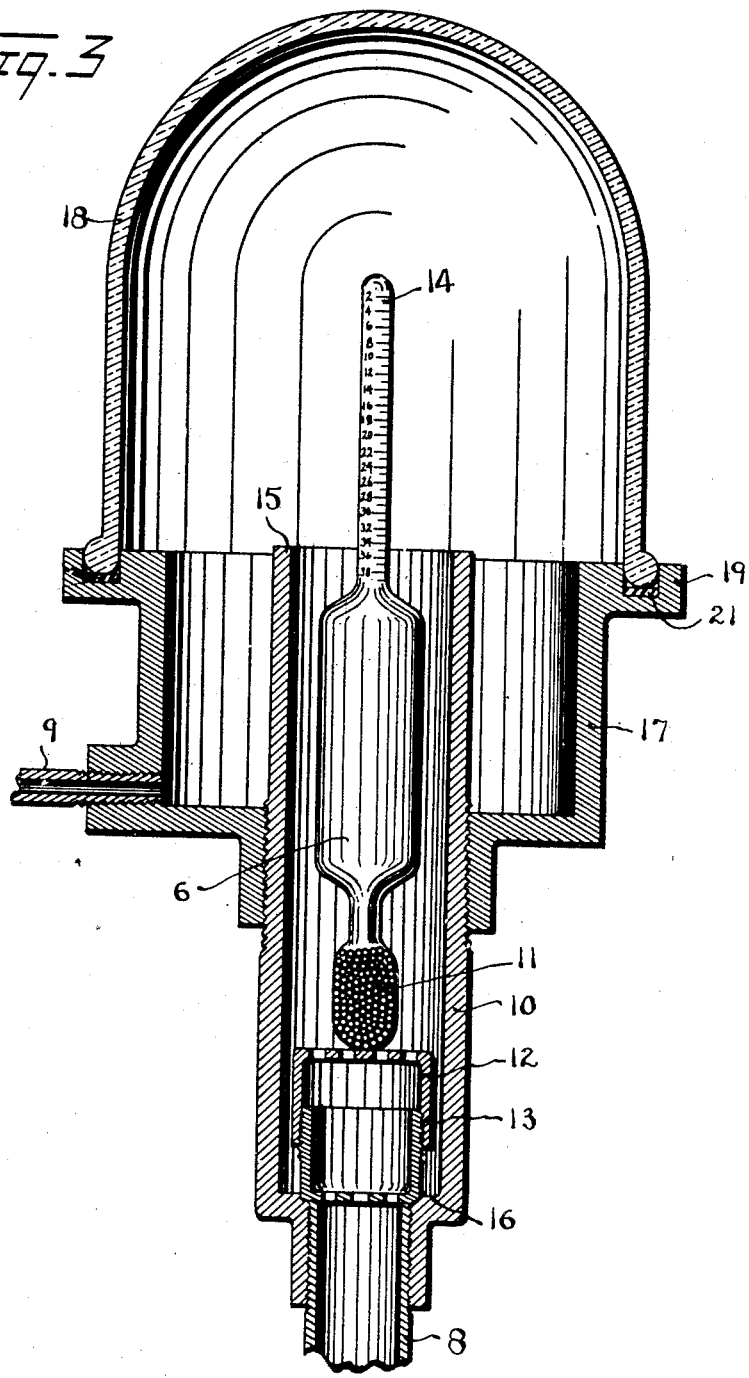

1,801,168

UNITED STATES PATENT OFFICE

JOHN M. McCLATCHIE, OF NEW YORK, N. Y., ASSIGNOR TO THE BORDEN COMPANY, OF NEW YORK, N. Y., A CORPORATION OF NEW JERSEY

APPARATUS FOR TESTING THE DENSITY OF LIQUIDS IN VACUUM PANS AND THE LIKE

Original application filed June 15, 1926, Serial No. 116,141. Divided and this application filed November 29, 1926. Serial No. 151,303.

The invention relates to an improvement in apparatus for testing the density of liquids in vacuum pans or other evaporating receptacles. The present application is a division of my copending application 116,141, filed June 15, 1926. This application is directed to the novel arrangement of hydrometer attachment for the vacuum pan shown and described but not claimed in said application.

In order to test the density of liquids undergoing condensation, it has heretofore been customary to draw off a portion of the liquid from the vacuum pan or other evaporating receptacle so that a hydrometer or similar testing device might be availed of for testing the density of the liquid. This method has proven unsatisfactory in several particulars. It involves the personal judgment of the operator as to the proper times for making the tests. Usually several tests must be made before the liquid is found to have reached the desired degree of concentration. When the liquid is approaching the proper degree of concentration, the tests are more frequently made to avoid the possibility of over-concentration. In spite of this precaution, however, over-concentration sometimes occurs and it is then necessary to add untreated liquid to restore the over-condensed liquid to the proper degree of thinness. These operations are not only time consuming but also result in waste of material. The object of the present invention is to produce a density testing apparatus adapted for application to a vacuum pan or other evaporating receptacle so that the operator may at any time ascertain the density of the liquid in the pan or other receptacle without the necessity of withdrawing samples for testing. To this end the invention consists in the improved density testing apparatus hereinafter described and particularly pointed out in the appended claims.

In the accompanying drawings illustrating the preferred form of the invention, Fig. 1 is a side elevation, with certain parts shown in section, of the improved density testing apparatus and showing its application to a vacuum pan, only a portion of the latter being indicated in the drawing; Fig. 2 is an enlarged detail of the adjustable thimble for supporting the hydrometer; and Fig. 3 is an enlarged section of the parts of the apparatus associated with the hydrometer.

Although the improved density testing apparatus of the present invention may be used in connection with any usual type of evaporating vessel, it is shown in the drawings as applied to a vacuum pan, a portion of which is indicated at 5. It is assumed that the vacuum pan 5 is used for evaporating or condensing milk or other liquid.

The improved density testing apparatus comprises a hydrometer 6 of usual construction and mode of operation located in a by-pass or conduit connected with the vacuum pan 5. The conduit consists of the pipes 7, 8 and 9, the pipe 7 being connected with the bottom of the span and the pipe 9 with the top thereof. Screwed onto the upper part of the vertically arranged pipe 8 is a receptacle or reservoir 10 in which the hydrometer or specific gravity gauge 6 is located. The bulb 11 of the gauge rests on the upper surface of a split thimble composed of the members 12 and 13, the upper and lower surfaces of which are perforated to permit the passage of the evaporated milk therethrough. The members 12 and 13 of the thimble are cup-shaped and are screwed together so that the height of the graduations 14 on the stem of the hydrometer relatively to the upper edge 15 of the reservoir 10 may be properly regulated so as to keep the stem of the hydrometer from becoming coated with milk any considerable height above the usual reading height. The member 13 of the thimble rests on the internal shoulder 16 at the bottom of the reservoir 10. By turning the thimble parts 12 and 13 the height of the upper, gauge supporting surface of the part 12 is adjusted so that the proper graduation on the stem 14 of the gauge will come substantially opposite the edge 15 of the receptacle 10, having regard to the desired density of the liquid undergoing evaporation in the pan 5. Different hydrometers or gravity gauges usually vary a little in height from the bottom of the bulb 11 to the graduations on the stem 14. Consequently it is necessary to provide an adjustable support so that until the liquid undergoing evaporation has approached the desired density, the graduation on the stem indicating the requisite density will be held only slightly below the upper edge 15 of the receptacle 10. Thus when the liquid has been evaporated to the predetermined extent the hydrometer or gravity gauge need rise only slightly to indicate that the liquid in the pan has been properly concentrated. If no adjustable support were used the variation in the length or height of the gauges might result in the stems of some of the gauges becoming coated with milk a considerable distance above the reading point and thereby add to the weight of the gauge and thus affect its accuracy.

Threaded onto and surrounding the upper part of the reservoir is an overflow basin 17, into one side of the lower part of which the intake end of the pipe 9 is inserted so as to drain the overflow from the reservoir back into the vacuum pan. A cover or dome 18 composed of glass or other transparent material surmounts the upper circular flanged edge 19 of the overflow basin 17 to enable the workman to read the graduations on the hydrometer. To establish an air-tight connection between the dome 18 and the basin 17 the lower edge of the dome is inserted into an annular recess 20 in the flange 19 and rests against an appropriate packing material 21 therein.

Milk or other liquid from the vacuum pan 5 is constantly circulated through the conduit in which the hydrometer is located by means of a pump 22 which may be of any suitable construction. The discharge end of the pipe 7 is connected with the intake end 23 of the pump and the intake end of the pipe 8 is connected with the discharge end 24 of the pump. In order that the pump 22 may operate under a vacuum, it is enclosed in an air-tight casing 25 conveniently supported on the legs 26. The casing 25 is connected by a pipe 27 with the upper end 28 of the vacuum pan. This arrangement prevents any air from entering the pump and disturbing the proper functioning of the hydrometer. The receptacle or reservoir 10 is kept constantly full of milk or other liquid from the vacuum pan by means of the pump 22 and the overflow passes into the basin 17 whence it is drawn back into the vacuum pan though the pipe 9. The pump 22 is provided with the removable plugs 29 so that the passages therein may be readily cleaned. The pump may be driven in any preferred manner by a pulley or gear mounted on the shaft 30 projecting through the wall of the casing 25.

The above described construction is such that the operator may ascertain accurately and at the precise moment when the milk or other liquid undergoing evaporation in the vacuum pan has reached the desired degree of concentration. When the milk or other fluid has been evaporated sufficiently the density of the milk will cause the hydrometer to rise slightly, thereby bringing the proper graduation opposite the edge 15 of the reservoir. Thus the operator has simply to watch the graduations on the hydrometer relatively to the upper edge 15 of the reservoir to know whether the liquid undergoing evaporation in the vacuum pan has reached the desired degree of density.

Having thus described the invention what I claim as new is:—

1. An apparatus for testing the density of liquids in vacuum pans comprising, a pump, a pipe leading from the intake of the pump to the lower part of the vacuum pan, an air-tight casing in which the pump is enclosed, a pipe leading from the interior of the casing into the upper part of the vacuum pan, a vertically arranged receptacle having an open top into the lower end of which the pump discharges the liquid drawn from the pan, a hydrometer located in the receptacle, transparent means for closing the open top of the receptacle, and means for receiving the overflow of liquid from the receptacle.

2. An apparatus for testing the density of liquids in vacuum pans comprising, a pump, a pipe leading from the intake of the pump into the lower part of the vacuum pan, an air-tight casing in which the pump is enclosed, a pipe leading from the interior of the casing into the upper part of the vacuum pan, a vertically arranged receptacle having an open upper end, a vertically arranged pipe leading from the discharge of the pump into the bottom of the receptacle, a hydrometer located in the receptacle with its graduated end projecting beyond the upper end thereof, an overflow basin surrounding the receptacle, a pipe leading from the overflow basin into the upper part of the vacuum pan, and transparent means for enclosing the upper part of the receptacle and the overflow basin.

3. An apparatus for testing the density of liquids in vacuum pans comprising, a pump for drawing a portion of the liquid from the pan, a vertically arranged receptacle having an open upper end, a pipe connecting the discharge of the pump with the bottom of the receptacle, means for receiving the overflow liquid from the receptacle, a hydrometer located in the receptacle and having its graduated end projecting upwardly beyond the upper edge of the receptacle, and adjustable means in the receptacle for supporting the hydrometer when the density of the liquid in the receptacle is below a predetermined degree.

4. An apparatus for testing the density of liquids in vacuum pans comprising, a pump, a pipe leading from the intake of the pump into the lower part of the vacuum pan, an air-tight casing in which the pump is enclosed, a pipe leading from the interior of the casing into the upper part of the vacuum pan, a vertically arranged receptacle having an open upper end, a pipe leading from the discharge of the pump into the bottom of the receptacle, an adjustable thimble having perforated top and bottom ends located in the lower part of the receptacle, a hydrometer located in the receptacle with its graduated end projecting upwardly through the open upper end of the receptacle, the hydrometer being supported on the thimble when the density of the liquid in the receptacle is below a predetermined degree, an overflow basin surrounding the receptacle, a pipe leading from the basin into the upper part of the vacuum pan, and a transparent cover enclosing the upper part of the receptacle and the overflow basin.

5. In an apparatus of the character described including a vertically arranged receptacle and a hydrometer located in the receptacle, an adjustable thimble for supporting the hydometer while the density of the liquid in the receptacle is below a predetermined degree, said thimble being composed of two relatively movable parts.

6. In an apparatus of the character described including a vertically arranged receptacle and a hydrometer located in the receptacle, an adjustable thimble located in the bottom of the receptacle for supporting the hydometer while the density of the liquid in the receptacle is below a predetermined degree, said thimble being composed of two cup-shaped parts threaded together at their free ends, the closed ends of said parts being perforated to permit flow of liquid through the thimble.

JOHN M. McCLATCHIE.